United States Patent
Tseng et al.

(10) Patent No.: US 7,466,460 B2
(45) Date of Patent: Dec. 16, 2008

(54) SCANNER WITH A LATERAL REVERSING DEVICE

(76) Inventors: Wen-Chao Tseng, No. 56, Minju St., Wufeng Shiang, Taichung (TW) 413; Ann-Lun Lee, 3Fl., No. 10, Lane 70, Wuyi St., Lingya Chiu, Kaohsiung (TW) 802

( * ) Notice: Subject to any disclaimer, the term of this patent is extended or adjusted under 35 U.S.C. 154(b) by 1016 days.

(21) Appl. No.: 10/403,093

(22) Filed: Apr. 1, 2003

(65) Prior Publication Data
US 2004/0066541 A1    Apr. 8, 2004

(30) Foreign Application Priority Data
Oct. 3, 2002    (TW) ............................... 91122909 A

(51) Int. Cl.
*H04N 1/04*    (2006.01)
(52) U.S. Cl. .................. 358/474; 358/498; 358/497; 358/496; 271/228; 399/351
(58) Field of Classification Search ................ 358/474, 358/498, 497, 496, 501, 505; 399/388, 302, 399/374, 351; 355/296, 131; 271/228, 225, 271/9.01, 3.14
See application file for complete search history.

(56) References Cited

U.S. PATENT DOCUMENTS

| | | | | |
|---|---|---|---|---|
| 4,346,880 A | * | 8/1982 | Roller et al. ................ | 271/186 |
| 5,513,017 A | * | 4/1996 | Knodt et al. ................ | 358/471 |
| 5,535,012 A | * | 7/1996 | Matsumoto et al. ......... | 358/400 |
| 5,579,099 A | * | 11/1996 | Nishiyama et al. .......... | 399/371 |
| 5,579,129 A | * | 11/1996 | Iwata et al. ................ | 358/474 |
| 5,644,663 A | * | 7/1997 | Saito et al. ................. | 382/313 |
| 5,729,350 A | * | 3/1998 | Ozaki ........................ | 358/296 |
| 5,729,359 A | * | 3/1998 | Nakazawa et al. .......... | 358/498 |
| 6,400,472 B1 | * | 6/2002 | Yoshimizu .................. | 358/498 |
| 6,969,065 B2 | * | 11/2005 | Inoue et al. ................. | 271/227 |
| 7,016,090 B2 | * | 3/2006 | Sekine ....................... | 358/498 |
| 7,147,222 B2 | * | 12/2006 | Christensen et al. ........ | 271/228 |
| 2003/0063336 A1 | * | 4/2003 | Cho .......................... | 358/498 |
| 2004/0184120 A1 | * | 9/2004 | Araki et al. ................. | 358/497 |
| 2008/0043294 A1 | * | 2/2008 | Su et al. ..................... | 358/474 |
| 2008/0106773 A1 | * | 5/2008 | Akiyama .................... | 358/496 |

FOREIGN PATENT DOCUMENTS

CN    2502903 Y    7/2002

* cited by examiner

*Primary Examiner*—Edward L Coles
*Assistant Examiner*—Negussie Worku
(74) *Attorney, Agent, or Firm*—Stolowitz Ford Cowger LLP

(57) ABSTRACT

A scanner including at least a casing, a scanning platform, a carriage and a lateral reversing device is provided. The scanning platform is installed on the covering panel of the casing and is used to accommodate at least one document. The carriage is movably installed in the casing and will transmit a scan-finished signal after having scanned the front side of a document. The lateral reversing device, which is installed at a lateral side of the scanning platform, is equipped with a control unit and is used to turn the document over for the reverse side of the document to be scanned after the control unit has received the scan-finished signal.

23 Claims, 9 Drawing Sheets

SCANNER WITH A LATERAL REVERSING DEVICE

This application claims the benefit of Taiwan application Serial No. 91122909, filed on Oct. 3, 2002.

BACKGROUND OF THE INVENTION

1. Field of the Invention

The invention relates in general to scanner, and more particularly, to a scanner with a lateral reversing device.

2. Description of the Related Art

Please refer to FIG. 1, a three-dimensional structural diagram of a general scanner 100. In FIG. 1, the scanner 100 includes a base 102 and a covering lid 104, wherein the covering lid 104 is installed on the base 102 by bucking one end of the covering lid 104 on one end of the base 102 via a pivotal shaft device 106 so that the covering lid 104 can open from and close to the base 102.

The base 102 includes a covering panel 108, a scanning platform 110 and a carriage 114, wherein the covering panel 108 is situated on top of the base 102 while the scanning platform 110 on which a document 112 are placed is installed on the covering panel 108. Of which, the carriage 114, which is movably installed in the base 102, can move along the arrow 150 back and forth to scan the document 112 when the covering lid 104 is closed to the base 102.

When the front side of the document 112 is to be scanned, the user has to, first of all, lift the covering lid 104 manually. Next, the user has to place the document 112 on the scanning platform 110, and the front side of the document 112 is faced downward. Following that, the user shall close the covering lid 104 to the base 102. At last, the user can now start the carriage 114 to scan the front side of the document 112.

If the reverse side of the document 112 is to be scanned, the user has to, first of all, lift the covering lid 104 manually. Next, the user has to turn the document over 112, and its reverse side is faced downward. Following that, the user shall close the covering lid 104 to the base 102. At last, the user can now start the carriage 114 to scan the reverse side of the document 112. Apart from that, when the carriage 114 is started, the carriage 114 starts to scan from the scan-starting point to the scan-finishing point. The next scanning process cannot be resumed unless the carriage 114 has returned to the scan-starting point again. As a consequence, the user not only has to turn the document over, but also has to wait for the carriage to return to the starting point.

The recurrent process of alternating the front side with reverse side of a document and the return of the carriage will cause tremendous inconveniences and waste of time to the user when there are a large number of documents to be processed.

SUMMARY OF THE INVENTION

It is therefore an object of the invention to provide a scanner with a lateral reversing device. The design of installing a lateral reversing device at a lateral side of the scanning platform enables the scanner to overturn the document after the front side has been scanned so the reverse side can be scanned, achieving a double-sided scanning function. The user does not have to turn the document over manually which is indeed very convenient.

It is therefore an object of the invention to provide a scanner including at least a casing, a scanning platform, a carriage and a lateral reversing device. The scanning platform is installed on the covering panel of the casing and is used to accommodate at least one document. The carriage is movably installed in the casing and will transmit a scan-finished signal after having scanned the front side of a document. The lateral reversing device, which is installed at a lateral side of the scanning platform, is equipped with a control unit and is used to turn the document over for the reverse side of the document to be scanned after the control unit has received the scan-finished signal.

It is therefore an object of the invention to provide a document double-sided scanning method which is applied to a scanner, wherein the scanner includes a carriage, a scanning platform where at least one document is placed, and a lateral reversing device which is installed at a lateral side of the scanning platform. According to the method, first of all, the carriage scans the front side of the document; next, the lateral reversing device overturns the document after the carriage has scanned the front side of the document; at last, the carriage scans the reverse side of the document.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
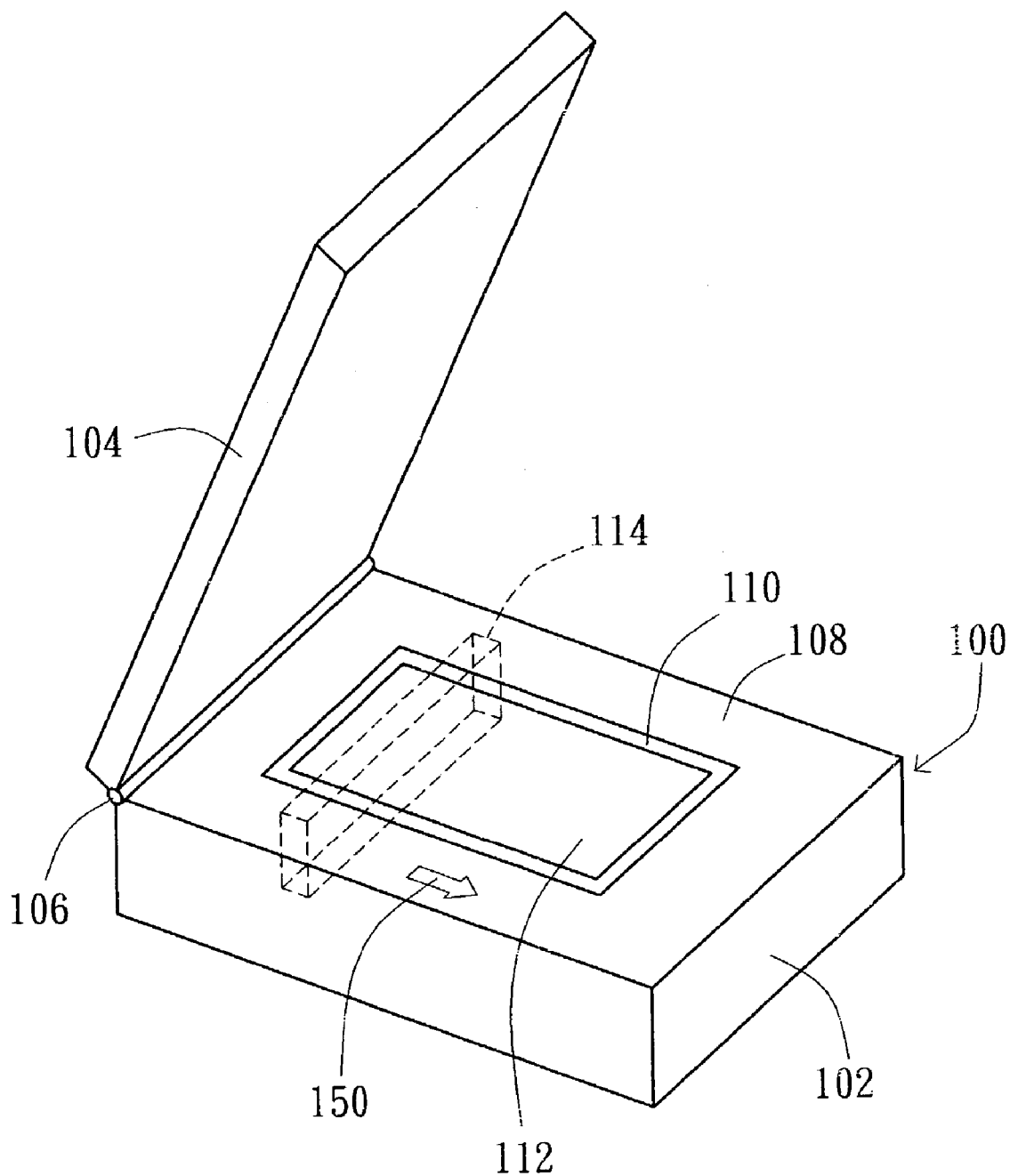
FIG. 1 shows a three-dimensional structural diagram of a conventional scanner.
Figure 2:
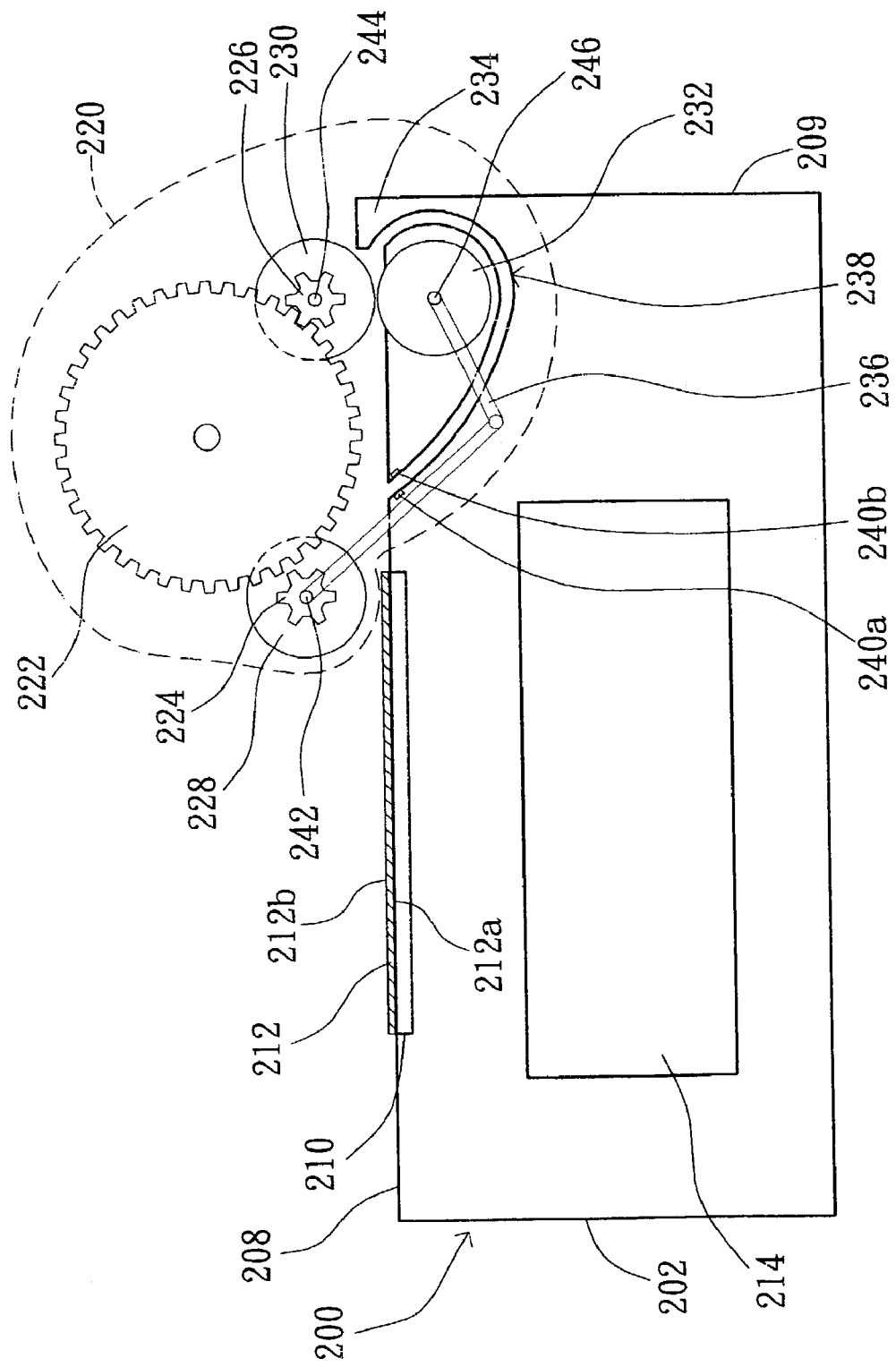
FIG. 2 shows a cross-sectional view of a scanner equipped with a lateral reversing device according to a preferred embodiment of the invention.

Referring first to FIG. 2, a cross-sectional view of a scanner 200 equipped with a lateral reversing device 220 according to a preferred embodiment of the invention. In FIG. 2, the scanner 200 includes at least a casing 202, a scanning platform 210, a carriage 214, and a lateral reversing device 220 (the area within the dotted line as shown in FIG. 2). The casing 202 is equipped with a covering panel 208 and a lateral panel 209; the scanning platform 210 on which a document 212 is placed is installed on the covering panel 208; moreover, the document 212 has document front side 212a and document reverse side 212b.

The carriage 214, which is movably installed in the casing 202 and is used to scan the document front side 212a or document reverse side 212b, outputs a scan-finished signal after having scanned the document front side 212a. The lateral reversing device 220, which is installed on the covering panel 208 and is situated at a lateral side of the scanning platform 210, overturns the document 212 for document reverse side 212b to be scanned as soon as document front side 212a has been scanned by the carriage 214.

The design of the lateral reversing device 220 according to the invention overturns the document 212 automatically, exempting the user from overturning the document 212 manually which is indeed very convenient.

The lateral reversing device 220 includes a driving gear 222, a first passive gear 224, a second passive gear 226, a first roller 228, a second roller 230, a third roller 232, a first shaft 242, a second shaft 244, a third shaft 246, a baffle 234, a gyration orbit 238, and a sensing unit. Of which, the sensing unit can be, for example, an infrared emitter 240a and an infrared receiver 240b. All of the driving gear 222, the first passive gear 224, and the second passive gear 226 are vertically installed on top of the covering panel 208 and, moreover, are situated at a lateral side of the scanning platform 210. The first passive gear 224 can gear into the driving gear 222 or can be detached from the driving gear 222 in natural state, while the second passive gear 226 gears into the driving gear 222, the first passive gear 224 and the second passive gear 226 are situated to the two sides of the infra-margin of the driving gear 222. Of which, the first passive gear 224 is situated on an edge of the scanning platform 210 while the second passive gear 226 is close to the lateral panel 209.

Figure 3:
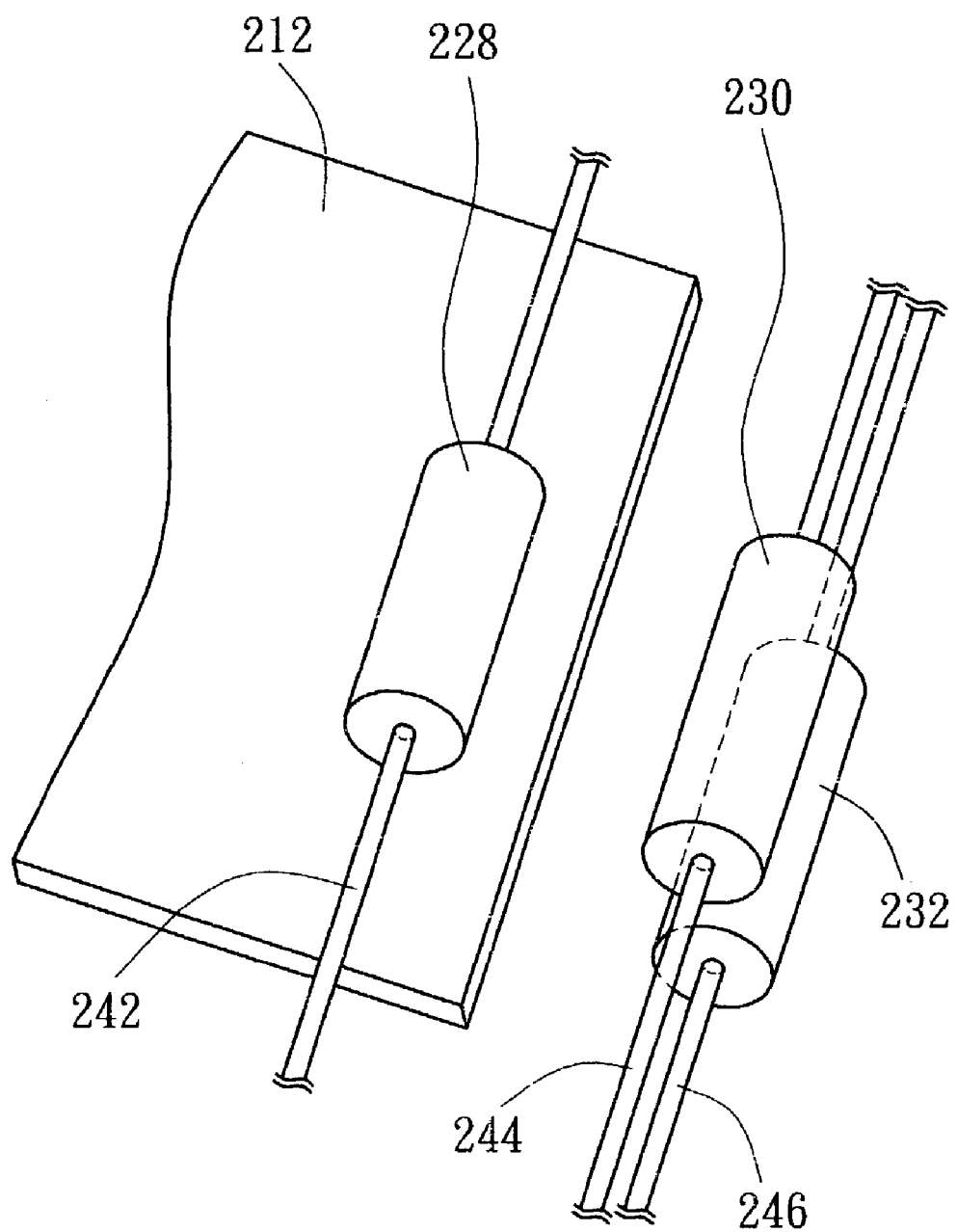
FIG. 3 is a schematic diagram for the first roller, the second roller, and the third roller as well as the first shaft, the second shaft, and the third shaft.

As shown in FIG. 3, the two sides of the first roller 228, the second roller 230, and the third roller 232 extend outwardly to form the first shaft 242, the second shaft 244, and the third shaft 246 respectively around which the first roller 228, the second roller 230, and the third roller 232 rotate individually. Furthermore, the first roller 228, the second roller 230, and the third roller 232 are penetrated and fixed by the first shaft 242, the second shaft 244, and the third shaft 246 respectively. The first roller 228 is situated on an edge of the scanning platform 210, while the third roller 232 and the second roller 230, which are installed as a pair on the covering panel 208 in FIG. 2, and the third roller 232 is above the second roller 230. Moreover, the extension of the second shaft 244 and the third shaft 246 parallels to the direction of the movement of the carriage 214 as shown in FIG. 2.

It is noteworthy that one of the two ends of the first shaft 242, the second shaft 244 and the third shaft 246 as shown in FIG. 3 are connected to the axis of the first passive gear 224, the axis of the second passive gear 226 and one end of the movable shaft 236 as shown in FIG. 2 respectively, while the other end of the movable shaft 236 is connected to and rotates around the axis of the first passive gear 224. By the same token, anyone who is familiar with the technology of the invention will understand that the other end of first shaft 242, the second shaft 244 and the third shaft 246 can be connected to a sporting structure in a rotatable way (not shown in FIG. 3). That is to say, the first roller 228 is connected to the first passive gear 224 via the first shaft 242 to synchronize with the driving gear 222 and the first passive gear 224 and rotate along the first or the second direction carrying the document 212 to enter or leave the lateral reversing device 220. The second roller 230 is connected to the second passive gear 226 via the second shaft 244 to synchronize with the driving gear 222 and the second passive gear 226. The third roller 232 and the second roller 230 are used to clip the document 212, and the two rollers can rotate synchronously along the first direction to move the document 212 forward.

The gyration orbit 238, which is installed in the casing 202 and situated beneath the covering panel 208 and the third roller 232, is used for the document 212 to pass through to be overturned. The baffle 234 is installed in the lateral panel 209 with a position higher than the infra-margin of the second roller 230 and the entrance of the gyration orbit 238 as well, guiding the document 212 to be fed into the gyration orbit 238. The infrared emitter 240a and infrared receiver 240b are installed around the two sides of the exit of the gyration orbit 238, wherein the exit of the gyration orbit 238 is situated on the covering panel 208 lying between the first roller 228 and the second roller 230. In other words, the entrance and exit of the gyration orbit 238 are two openings of the covering panel 208.

Figure 4:
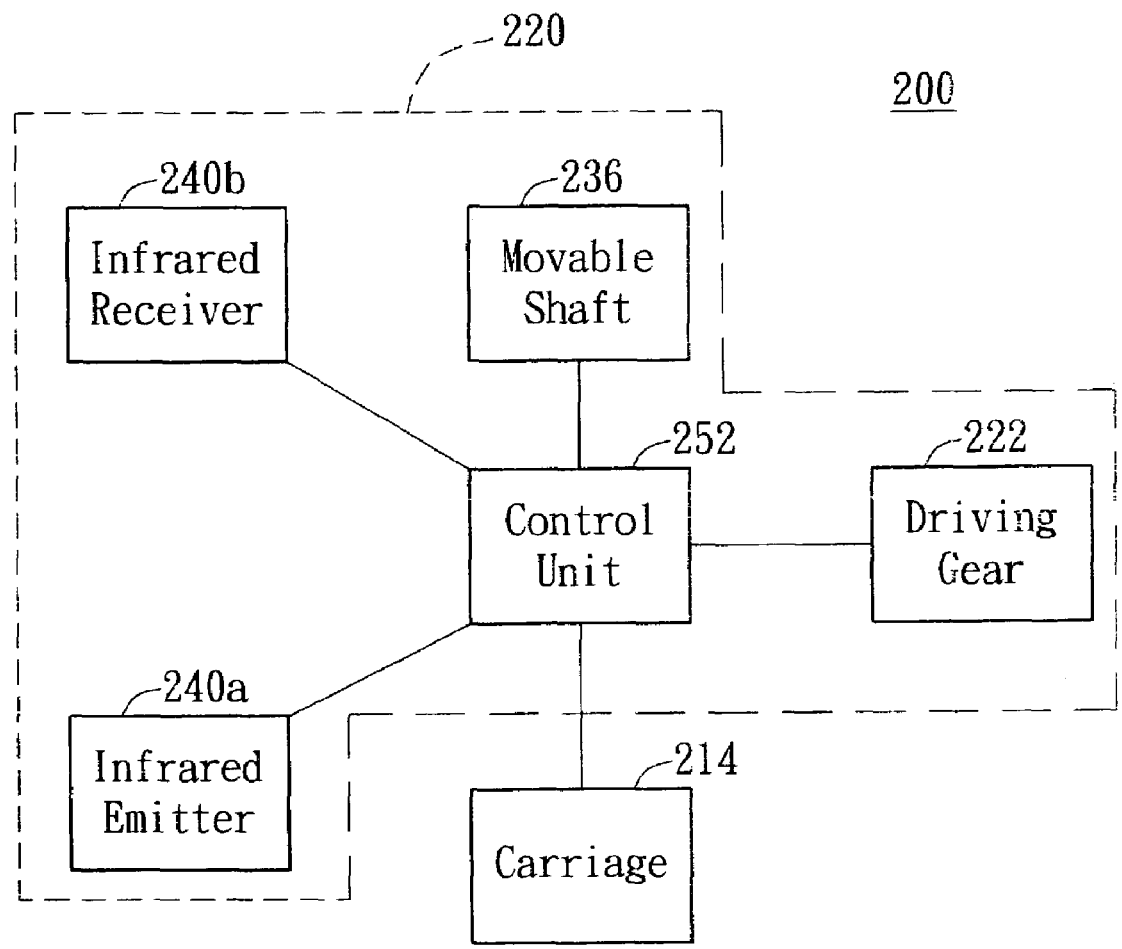
FIG. 4 is a block diagram according to the scanner shown in FIG. 2.

Please refer to FIG. 4, a block diagram according to the scanner as shown in FIG. 2. In FIG. 4, the lateral reversing device 220 is equipped with a control unit 252 which is coupled to the driving gear 222, the movable shaft 236, the carriage 214, the infrared emitter 240a and the infrared receiver 240b. The control unit 252 controls the infrared emitter 240a transmitting infrared to the infrared receiver 240b. When the infrared is blocked by something in the gyration orbit 238 and the infrared receiver 240b is unable to receive the infrared emitted by the infrared emitter 240a, the infrared receiver 240b will transmit an interrupted signal to the control unit 252. On receiving the interrupted signal, the control unit 252 controls the driving gear 222 to change its rotation direction accordingly. That is to say, on receiving the scan-finished signal or the interrupted signal, the control unit 252 controls the driving gear 222 to rotate in the first or the second direction accordingly; moreover, the first passive gear 224 gears into or detach from the driving gear 222 when the control unit 252 receives the scan-finished signal or the interrupted signal.

The processes regarding how the lateral reversing device 220 according to the invention overturns the document are explained below. Please refer to FIG. 2, the user can select single-sided scanning module or double-sided scanning module using the operation interface of the scanner 200 (not shown in FIG. 2) before the document 212 is loaded and scanned. When the double-sided scanning module is selected and the carriage 214, after having scanned the document front side 212a, will transmit a scan-finished signal to the control unit 252. After receiving the scan-finished signal, the control unit 252 will control the movable shaft 236 to move towards the driving gear 222 so that the first passive gear 224 can gear into the driving gear 222 while the document 212 is held by the first roller 228 from above and an edge of the scanning platform 210 from underneath. Meanwhile, the carriage 214 starts to return to the scan-starting position.

Figure 5:
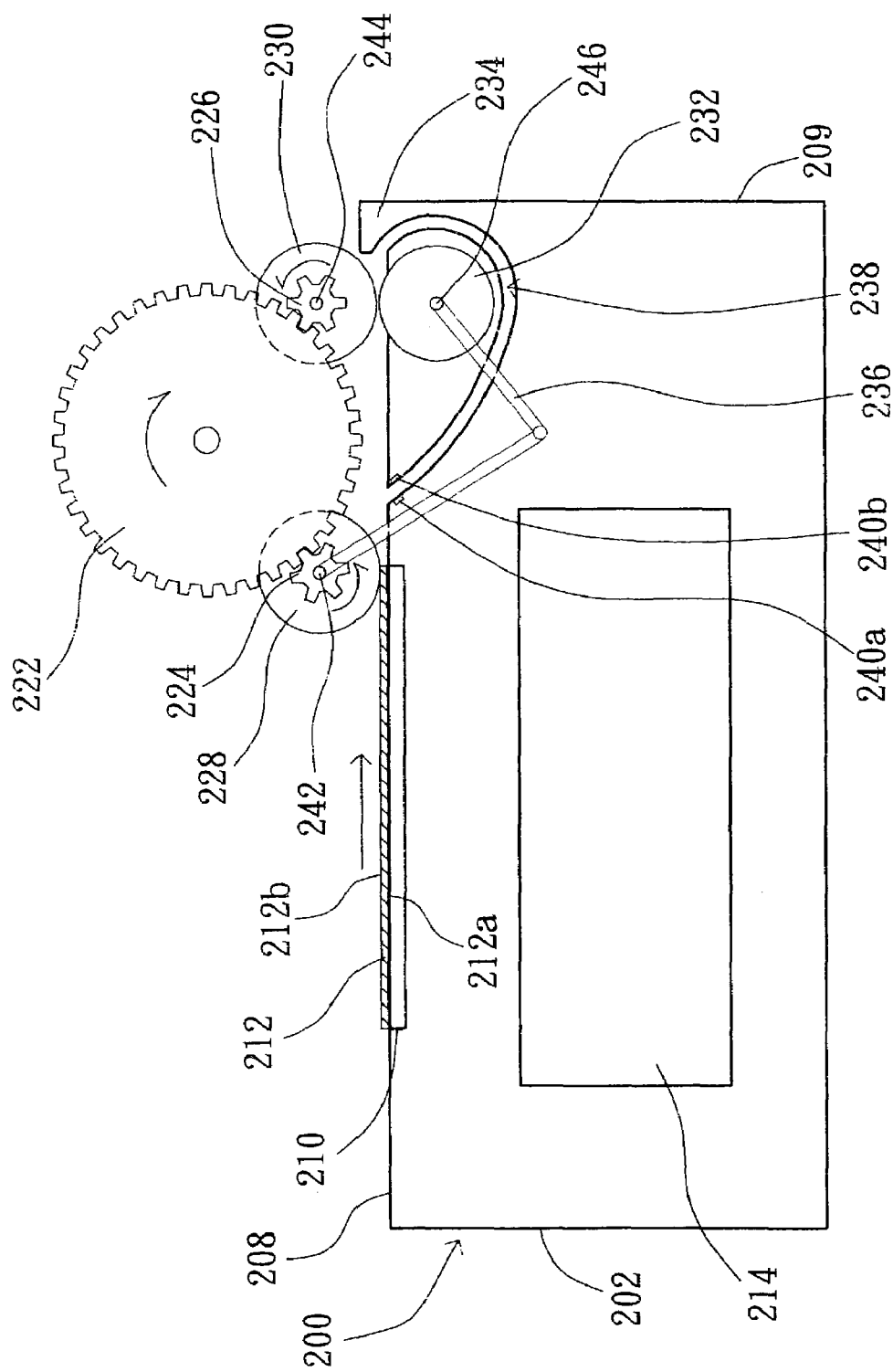
FIG. 5 shows a cross-sectional diagram of the first roller as shown in FIG. 2 carrying a document moving towards the second roller.
Figure 6:
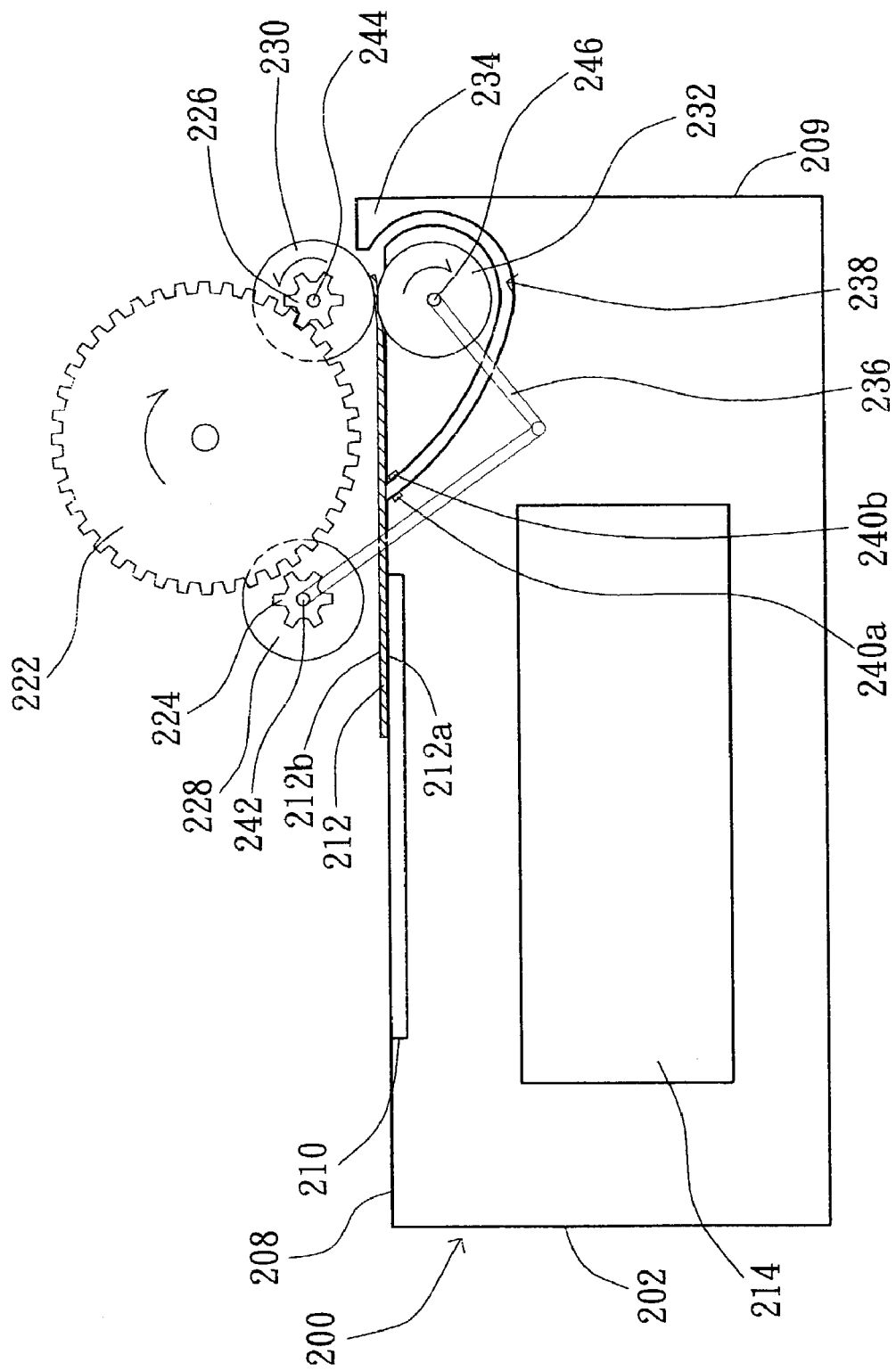
FIG. 6 shows a cross-sectional diagram of the second roller and the third roller in FIG. 2 carrying a document moving along the gyration orbit.

After that, the control unit 252 controls the driving gear 222 to rotate in the first direction. The driving gear 222 will carry the first passive gear 234, the second passive gear 226, the first roller 228 and the second roller to rotate in the first direction synchronously as shown in FIG. 5. The second contact roller 230 will carry the third contact roller 230 to rotate, while the first roller 228 will carry the document 212 to move towards the second roller 230.

The document 212, having been held by the second roller 230 and the third roller 232 from above and underneath the document 212, will move towards the baffle 234 along with the rotation of the second roller 230 and the third roller 232. The control unit 252 according to the invention can be designed to move the movable shaft 236 away from the driving gear 222 after its rotation has lasted for a period of time so that the first passive gear 224 detaches from the driving gear 222 and the first roller 228 keeps away from the edge of the scanning platform 210. It is noteworthy that after the driving gear 222 has rotated for a period of time, the second roller 230 and the third roller 232 must be able to hold the document 212 form above and underneath and rotate synchronously to carry the document 212 moving forwards, so that the first passive gear 224 can be detached from the driving gear 222. However, the above detachment should not influence the rotation of the driving gear 222.

Figure 7:
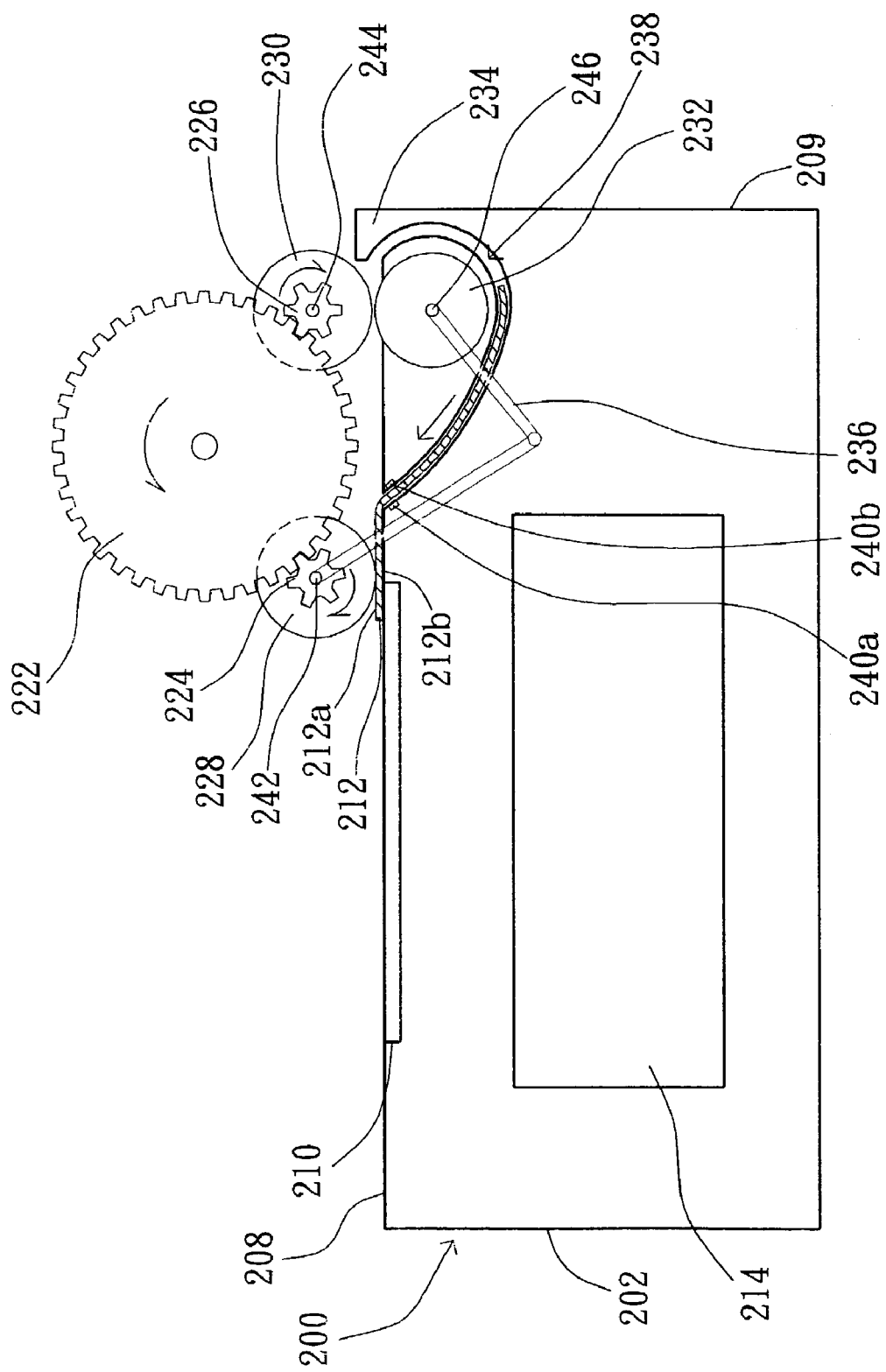
FIG. 7 shows a cross-sectional diagram of the document in the gyration orbit shown in FIG. 2 blocking the infrared emitted by the infrared emitter and moving towards the scanning platform when carried by the first roller.

Following that, the document 212 will be guided by the baffle 234 to enter the gyration orbit 238 via the entrance of the gyration orbit 238 as shown in FIG. 7. When the document 212 moves to the gyration orbit 238 and blocks the infrared emitted by the infrared emitter 240a, the infrared receiver 240b will not be able to receive the infrared emitted by the infrared emitter 240a. At this moment, the infrared receiver 240b will transmit an interrupted signal to the control unit 252. After the control unit 252 has received the interrupted signal for a period of time, the second roller 230 and the third roller 232 would have just carried the document 212 to show its front edge above the covering panel 208 via the exit of the gyration orbit 238 with the front edge of the document 212 being placed between the first roller 228 and an edge of the scanning platform 210. The control unit 252 will control the movable shaft 236 to move towards the driving gear 222 so that the first passive gear 224 can gear into the driving gear 222 while the document 212 is held by the first roller 228 from above and an edge of the scanning platform 210 from underneath.

Then, the control unit 252 will control the driving gear 222 to rotate in a second direction opposite to the first direction. The driving gear 222 will carry the first passive gear 224, the second passive gear 226, the first roller 228 and the second roller rotating synchronously in the second direction. The second contact roller 228 will carry the third contact roller 230 to rotate, while the first roller 228 will carry the document 212 moving towards the scanning platform 210.

Figure 8:
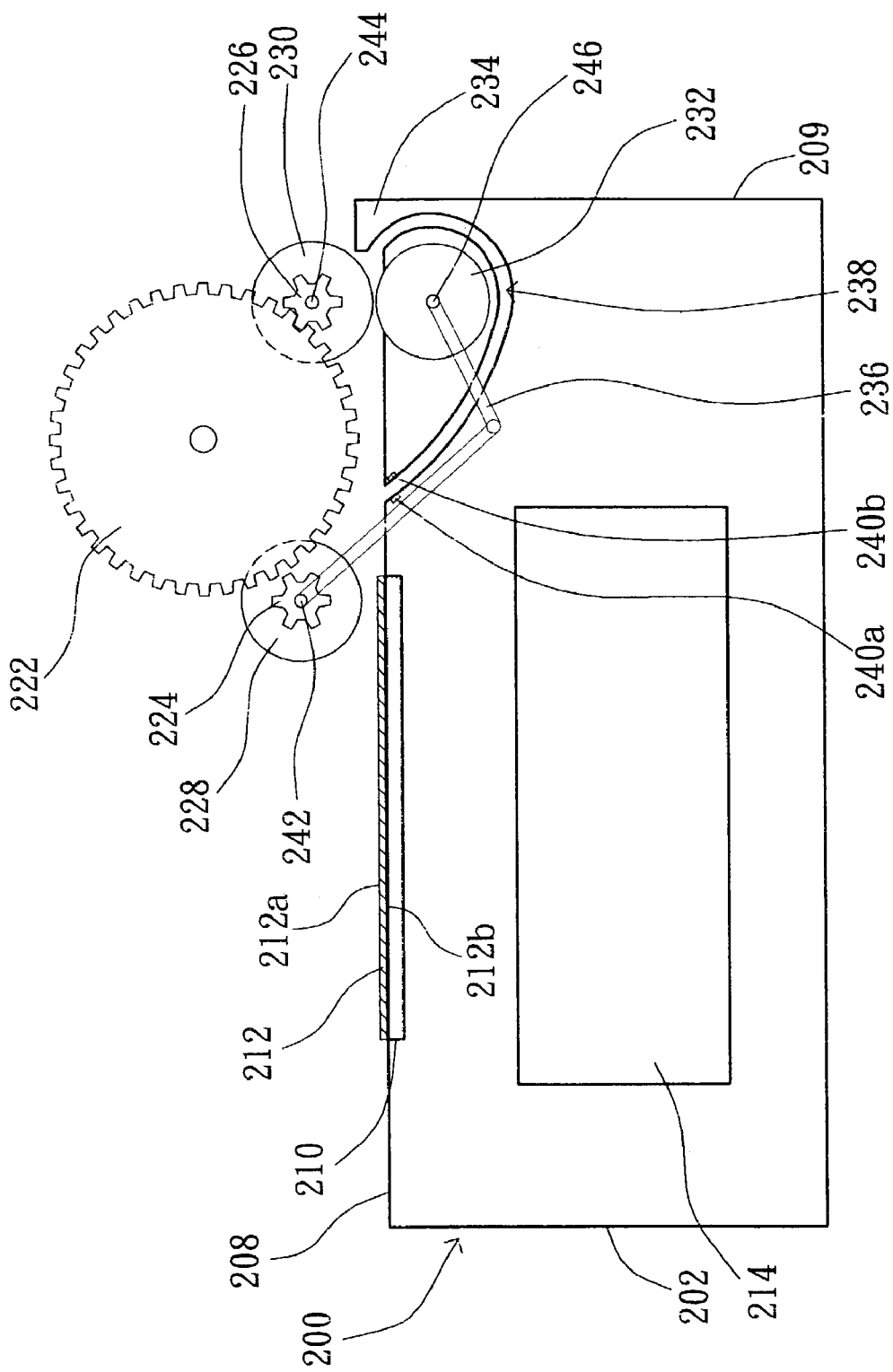
FIG. 8 is a cross-sectional diagram of the document in FIG. 2 having been overturned and placed on the scanning platform.

The document 212 would have returned to the scanning platform 210 with the document reverse side 212b facing downward a little while after the document 212 left the gyration orbit 238 and the infrared receiver 240b once again received the infrared emitted by the infrared emitter 240a. In the meanwhile, the carriage 214 would have returned to the scan-starting position as well. The control unit 252 will control the driving gear 222 to stop and the movable shaft 238 to move away from the driving gear 222, so that the first passive gear 224 detaches from the driving gear 222 and the first roller 228 stays away from the scanning platform 210 as shown in FIG. 8. Moreover, the control unit 252 according to the invention can be designed to halt the driving gear 222 a longer after the interrupted signal has been received, so that the document 212 would have just arrived at the scanning platform 210. Following that, the carriage 214 will move in a direction parallel to the second shaft 244 and the third shaft 246 and start to scan the document reverse side 212b. Since the following scanning processes are the same, they are simply omitted here.

Figure 9:
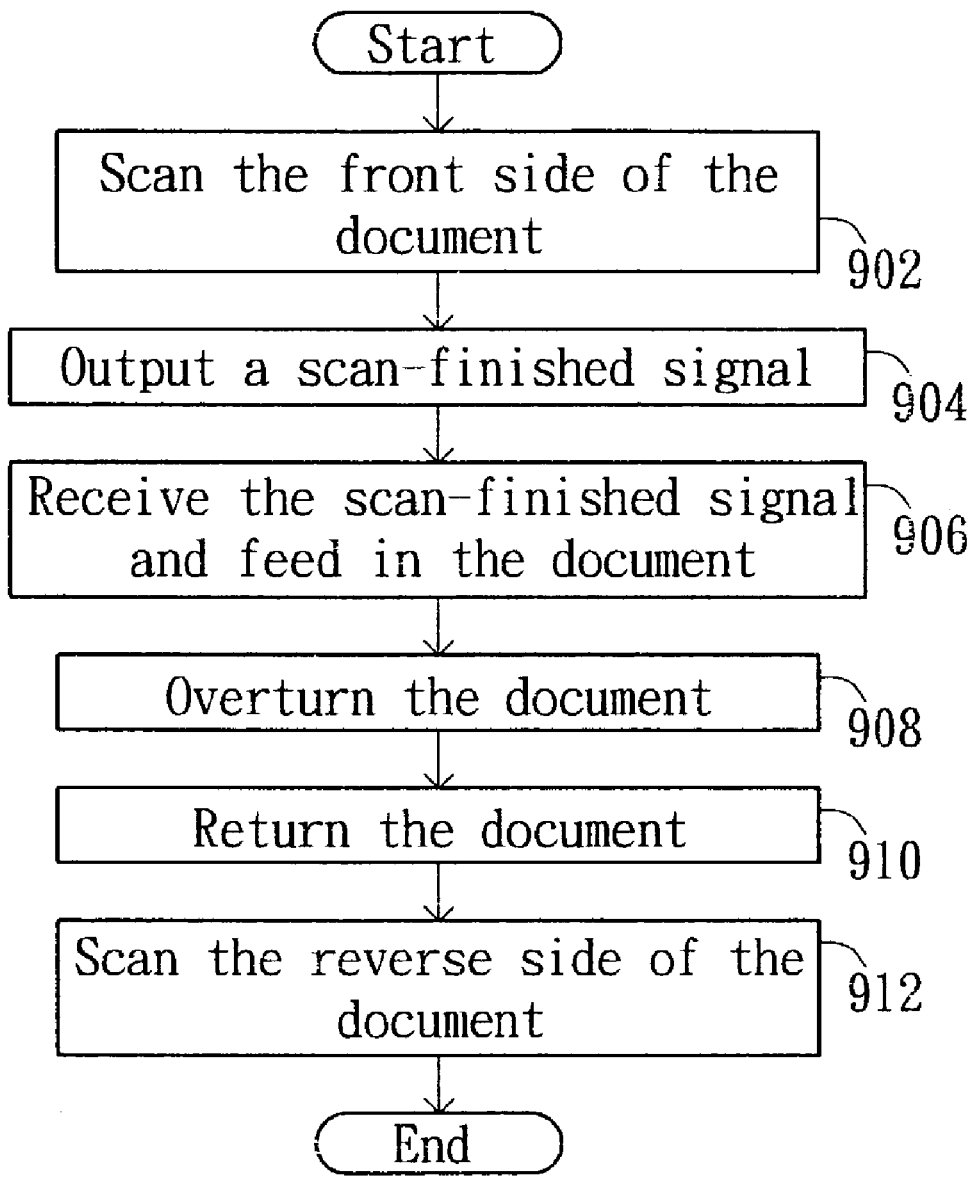
FIG. 9 is a flowchart illustrating the document double-sided scanning method according to a preferred embodiment of the invention.

According to the above explanations, the invention provides a document double-sided scanning method as shown in FIG. 9. In FIG. 9, first of all, the carriage scans the front side of the document from the scan-starting position in step 902. Next, proceed to step 904 where the carriage outputs a scan-finished signal after having scanned the front side of the document and starts to return to the scan-starting position accordingly. Following that, proceed to step 906. The control unit of the lateral reversing device, having received the scan-finished signal, enables a document to be fed into the lateral reversing device from the near side of the scanning platform. After that, proceed to step 908 where the lateral reversing device overturns the document. Then proceed to step 910 where the lateral reversing device returns the document to the scanning platform and the carriage has returned to the scan-starting position. Finally, proceed to step 912 where the carriage starts to scan the reverse side of the document from the scan-starting position and ends the method.

Anyone who is familiar with the technology of the invention will understand that its application is not limited thereto. For example, the infrared emitter and infrared receiver can be replaced by other sensing units which produce the same sensing effect. Besides, the movable shaft which connects the first passive gear and the third shaft can be replaced by other movable mechanisms or belt sets to move the first passive gear. Furthermore, the first shaft, the second shaft and the third shaft can be equipped with a number of rollers to further improve document holding and document carrying effect. The lateral reversing device according to the invention can be further equipped with a casing to protect the inside parts. An automatic document feeder(ADF), which peers with the lateral reversing device according to the invention, can be installed at the other side of the covering panel of the scanning platform facilitating the user to feed the document into the scanning platform.

It is noteworthy that the radius of the driving gear must be larger than that of the first and the second passive gears. The invention also allows the driving gear to be omitted, so that the control unit can directly control the rotation of the first and the second gears without using the driving gear as a rotating medium. Moreover, the gyration orbit according to the invention can be replaced by another gyration orbit bypassing the upper-margin of the second roller producing the same effect of document overturning.

If the infrared emitter and infrared receiver or other sensing units according to the invention are to be omitted, a number of timing which control the rotation of the driving gear as well as the gearing and detachment between the first passive gear and the driving gear need to be designed to assure the desired effect of document overturning.

Considering the time flow, first of all, the control unit moves the movable shaft away from the driving gear after the driving gear has started rotation for a first period of time, so that the first passive gear detaches from the driving gear and the first roller stays away from the scanning platform. During the mean while, the second roller and the third roller must be able to hold the document from both above and underneath and rotate synchronously to carry the document moving forward.

Following that, after the driving gear has rotated in a first direction for a second period of time longer than the first period of time, the control unit will move the movable shaft towards the driving gear so that the first passive gear can gear into the driving gear while the document is held by the first roller from above and the scanning platform from underneath. Meanwhile, the front edge of the document has already left the gyration orbit, and the control unit will control the driving gear to rotate in a second direction.

At last, after the driving gear has rotated in the second direction for a third period of time, the control unit will halt the driving gear while the document would just have returned to the scanning platform.

A scanner with a lateral reversing device is disclosed in the above preferred embodiments according to the invention. The design of installing a reversing device at a lateral side of the scanning platform enables the scanner to overturn the document after the front side has been scanned so the reverse side can be scanned, achieving a double-sided scanning function. The user does not have to turn the document over manually which is indeed very convenient.

While the invention has been described by ways of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A system, comprising:
   a scanning platform to accommodate at least one document;
   a carriage to scan a first side of the document on the scanning platform; and
   a lateral reversing device to retrieve the document from the scanning platform, to feed the document through a gyration path having a contour that overturns the document, and to provide the overturned document back to the scanning platform for the carriage to scan a second side of the document, wherein the carriage is configured to generate a scan-finished signal that indicates the scan of the first side of the document is complete, and wherein the lateral reversing device includes at least one roller that rotates in a first direction in response to the scan-finished signal to feed the document through at least a portion of the gyration path.

2. The system according to claim 1, wherein the lateral reversing device includes at least one sensing unit coupled to the gyration path, wherein the sensing unit is configured to generate an interrupt signal when the document is in the gyration path, and wherein the at least one roller is configured to rotate in a second direction in response to the interrupt signal and to provide the overturned document back to the scanning platform.

3. A scanner, comprising:
   a scanning platform to accommodate at least one document;
   a carriage to scan a first side of the document on the scanning platform;
   a lateral reversing device having a first roller that rotates when coupled to a drive gear, wherein:
   when rotating in a first direction, the first roller is configured to retrieve the document from the scanning platform and feed the document through a gyration path having a contour that overturns the document; and
   when rotating in a second direction, the first roller is configured to provide the document back to the scanning platform for the carriage to scan a second side of the document.

4. The scanner according to claim 3, wherein the lateral reversing device further comprises:
   a second roller configured to couple to the drive gear and forward the document through the gyration path by rotating in the first direction;
   a third roller configured to passively hold the document with the second roller and to rotate in the first direction to forward the document along the gyration path; and
   a movable coupling device configured to couple to the first roller, wherein the movable coupling device selectively couples or decouples the first roller with the drive gear.

5. The scanner according to claim 4, wherein the movable coupling device is configured to selectively decouple the first roller from the drive gear after the drive gear has rotated in the first direction for a period of time.

6. The scanner according to claim 4, wherein an exit of the gyration path is positioned between the first roller and the second roller.

7. The scanner according to claim 4, wherein the movable coupling device is configured to selectively couple the first roller to the drive gear in response to an interrupt signal that indicates the document is in the gyration path, and wherein the first roller rotates in the second direction to provide the document back to the scanning platform for the carriage to scan the second side of the document.

8. The scanner according to claim 3, further comprising a control unit to halt the drive gear after receiving the interrupt signal for a period of time.

9. The scanner according to claim 3, further comprising a sensing unit to detect the document in the gyration path and to transmit an interrupt signal that prompts the drive gear to rotate in the second direction.

10. A method comprising:
    scanning a first side of a document on a scanning platform;
    retrieving the document from the scanning platform;
    feeding the document through a gyration path having a contour that overturns the document after the scanning of the first side of the document;
    returning the overturned document to the scanning platform for scanning of a second side of the document; and
    selectively coupling a drive gear rotating in a first direction to a first roller in response to a scan-finished signal, wherein the first roller retrieves the document from the scanning platform and feeds the document through the gyration path to overturn the document.

11. The method according to claim 10, wherein the method further comprises:
    receiving the scan-finished signal that indicates the scanning of the first side of the document is complete;
    retrieving the document from the scanning platform and feeding the document through the gyration path to overturn the document in response to the scan-finished signal; and
    returning the overturned document to the scanning platform for scanning of the second side of the document.

12. The method according to claim 10, further comprising:
    receiving an interrupt signal that indicates the overturned document is in the gyration path; and
    returning the overturned document to the scanning platform for scanning of the second side of the document in response to the interrupt signal.

13. The method according to claim 10 further comprising selectively coupling the drive gear rotating in a second direction to the first roller in response to an interrupt signal, wherein the first roller provides the overturned document to the scanning platform.

14. The method according to claim 13, further comprising selectively coupling the first roller to the drive gear in response to at least one of the scan-finished signal, the interrupt signal, or after the drive gear has rotated in the first direction for a period of time.

15. The A system comprising:
    a scanning platform to accommodate at least one document;
    a carriage to scan a first side of the document on the scanning platform; and
    a lateral reversing device to retrieve the document from the scanning platform, to feed the document through a gyration path having a contour that overturns the document, and to provide the overturned document back to the scanning platform for the carriage to scan a second side of the document, wherein the lateral reversing device comprises:

a drive gear configured to rotate in a first direction in response to a scan-finished signal that indicates the scan of the first side of the document is complete and configured to rotate in a second direction in response to an interrupt signal that indicates the document is in the gyration path; and a first roller configured to couple to the drive gear in response to the scan-finished signal and configured to retrieve the document from the scanning platform by rotating in the first direction.

16. The system according to claim 15, further comprising:
a second roller configured to couple to the drive gear and forward the document through the gyration path by rotating in the first direction; and a third roller configured to passively hold the document with the second roller and to rotate in the first direction to forward the document along the gyration path.

17. The system according to claim 15, further comprising a movable coupling device configured to couple to the first roller, wherein the movable coupling device selectively couples or decouples the first roller with the drive gear.

18. The system according to claim 17, wherein the movable coupling device is configured to selectively couple or decouple the first roller to the driving gear in response to at least one of the scan-finished signal, the interrupt signal, or after the driving gear has rotated in the first direction for a period of time.

19. A system, comprising:
means for scanning a first side of a document on a scanning platform;
means for retrieving the document from the scanning platform and feeding the document through a gyration path having a contour that overturns the document;
means for selectively coupling a drive gear rotating in a first direction to the means for retrieving in response to a scan-finished signal that indicates the first side of the document has been scanned, wherein the means for retrieving retrieves the document from the scanning platform based, at least in part, on the selective coupling to the drive gear; and
means for returning the overturned document to the scanning platform for scanning of a second side of the document.

20. The system according to claim 19, further comprising means for receiving the scan-finished signal that indicates the scanning of the first side of the document is complete, wherein the means for retrieving is configured to retrieve the document from the scanning platform in response to the scan-finished signal and the means for feeding is configured to feed the document through the gyration path to overturn the document in response to the scan-finished signal.

21. The system according to claim 19, further comprising means for receiving an interrupt signal that indicates the overturned document is in the gyration path, wherein the means for returning is configured to return the overturned document to the scanning platform for scanning of the second side of the document in response to the interrupt signal.

22. The system according to claim 19, wherein the drive gear is configured to rotate in a second direction and the means for selectively coupling is configured to selectively couple the means for returning in response to an interrupt signal, and wherein the means for returning is configured to provide the overturned document to the scanning platform when coupled to the drive gear.

23. The system according to claim 22, wherein the means for selective coupling is further configured to selectively couple the means for returning to the drive gear after the drive gear has rotated in the first direction for a period of time.

* * * * *

UNITED STATES PATENT AND TRADEMARK OFFICE
CERTIFICATE OF CORRECTION

| | | |
|---|---|---|
| PATENT NO. | : 7,466,460 B2 | Page 1 of 1 |
| APPLICATION NO. | : 10/403093 | |
| DATED | : December 16, 2008 | |
| INVENTOR(S) | : Wen-Chao Tseng et al. | |

It is certified that error appears in the above-identified patent and that said Letters Patent is hereby corrected as shown below:

At column 8, line 49, please delete "10" and insert -- 10, --.

At column 8, line 59, delete "The A" and insert -- A --.

At column 9, line 16, begin a new line after the word "; and"

Signed and Sealed this

Twenty-sixth Day of October, 2010

David J. Kappos
*Director of the United States Patent and Trademark Office*